Sept. 4, 1956 F. COLLURA 2,761,659
FOOD AND BEVERAGE BLENDER
Filed Jan. 4, 1952 4 Sheets-Sheet 1
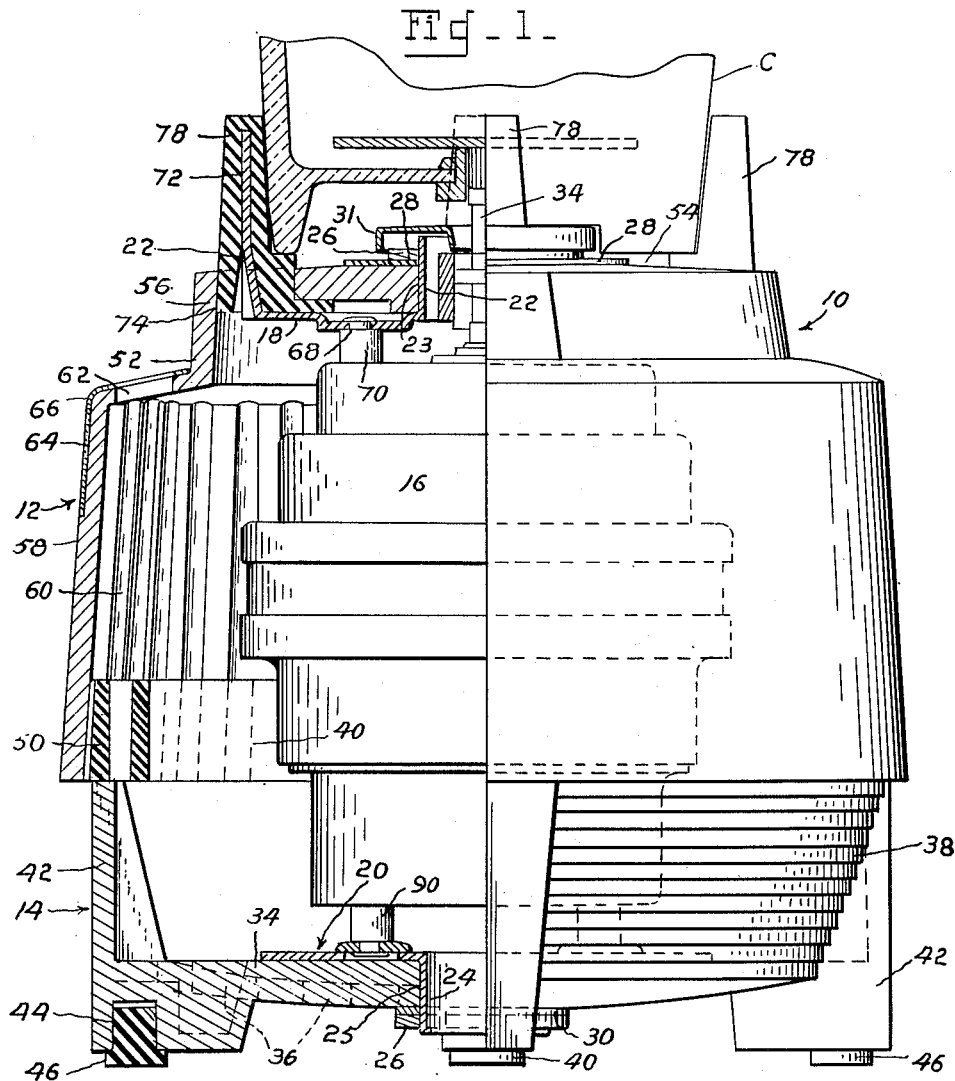
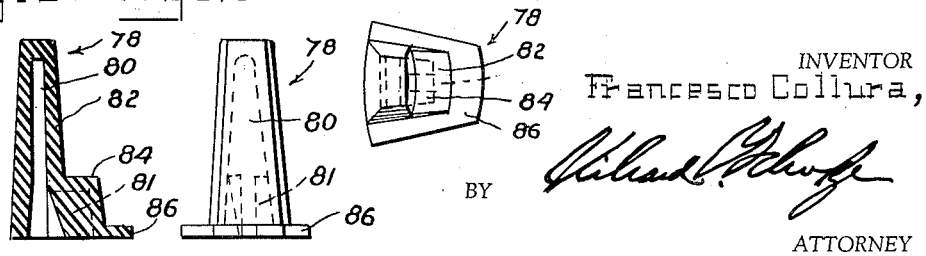
INVENTOR
Francesco Collura,
BY
ATTORNEY Sept. 4, 1956  F. COLLURA  2,761,659
FOOD AND BEVERAGE BLENDER
Filed Jan. 4, 1952  4 Sheets-Sheet 2
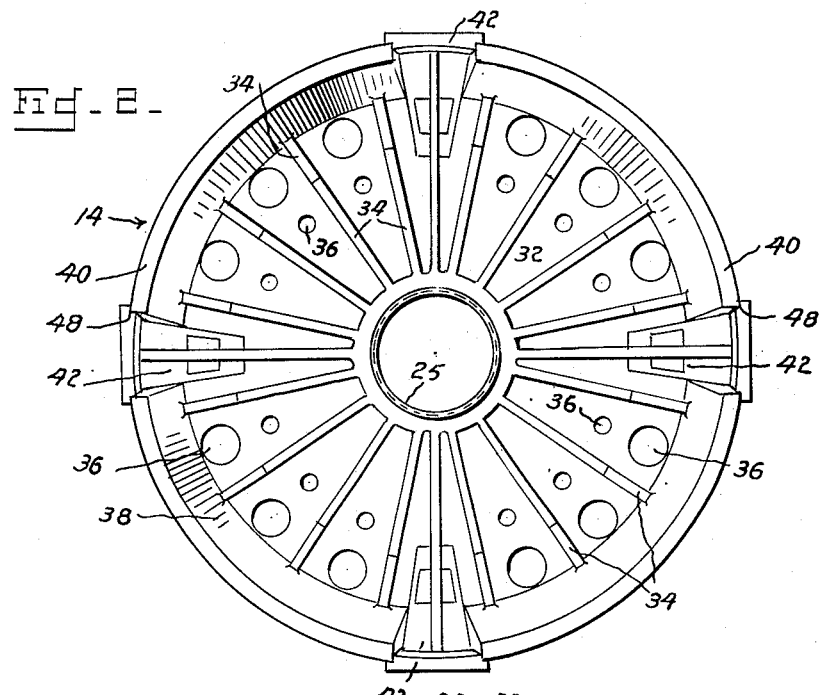
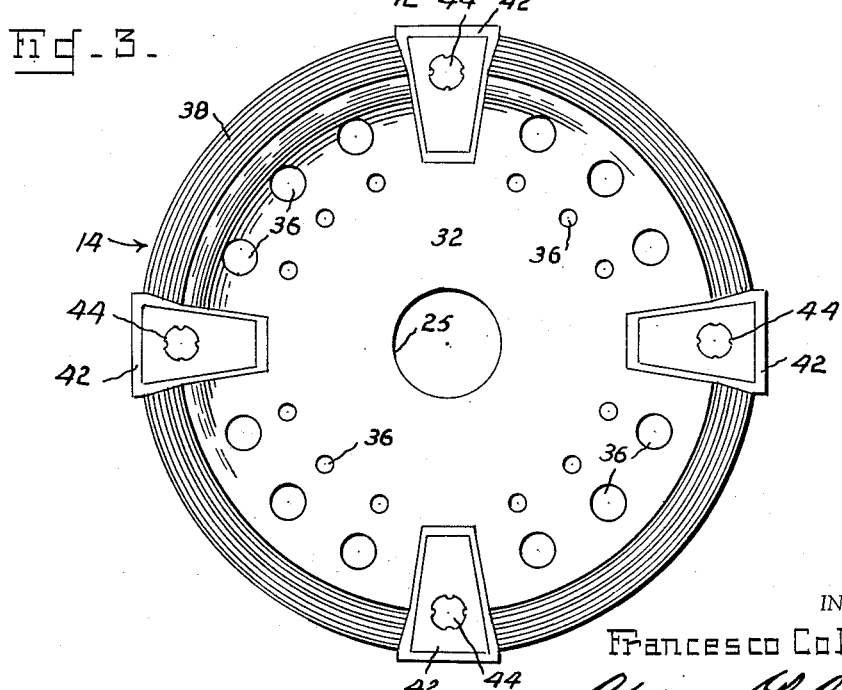
INVENTOR
Francesco Collura
BY
ATTORNEY

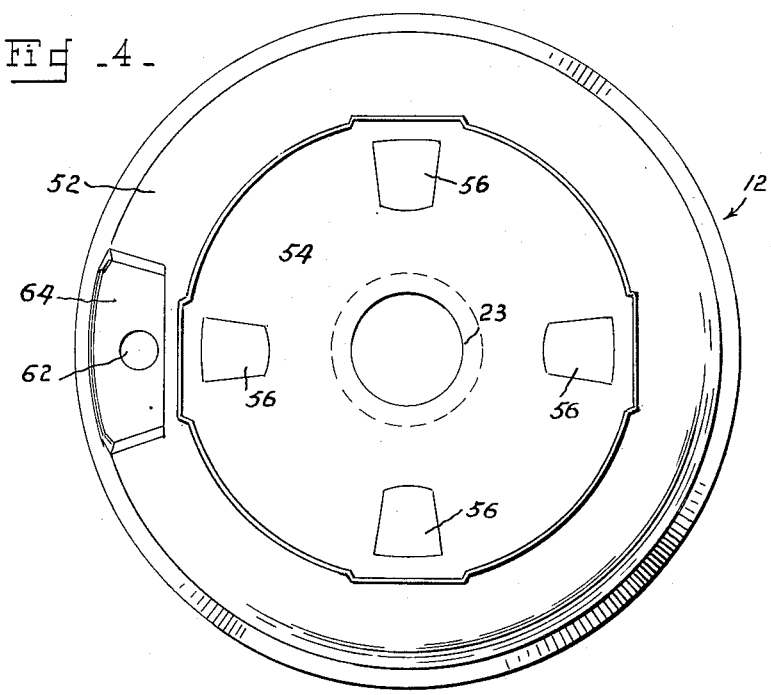
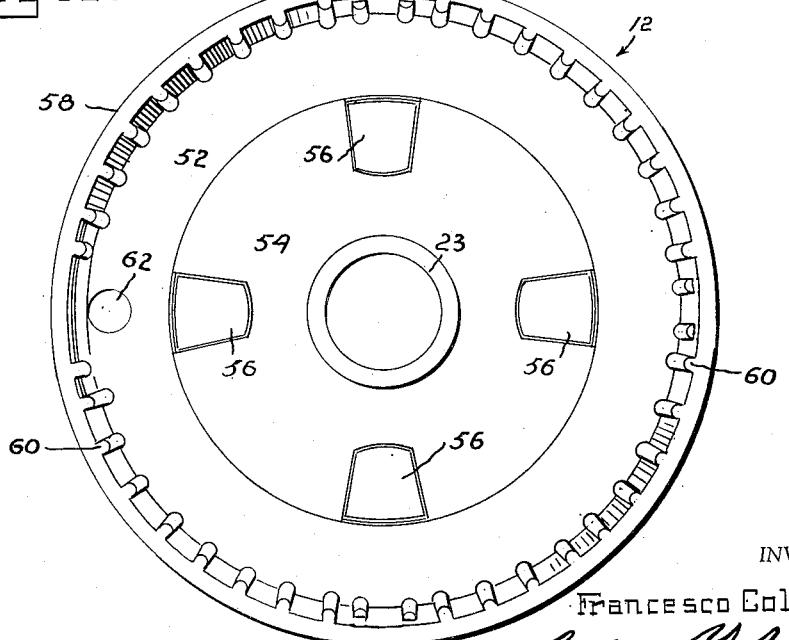

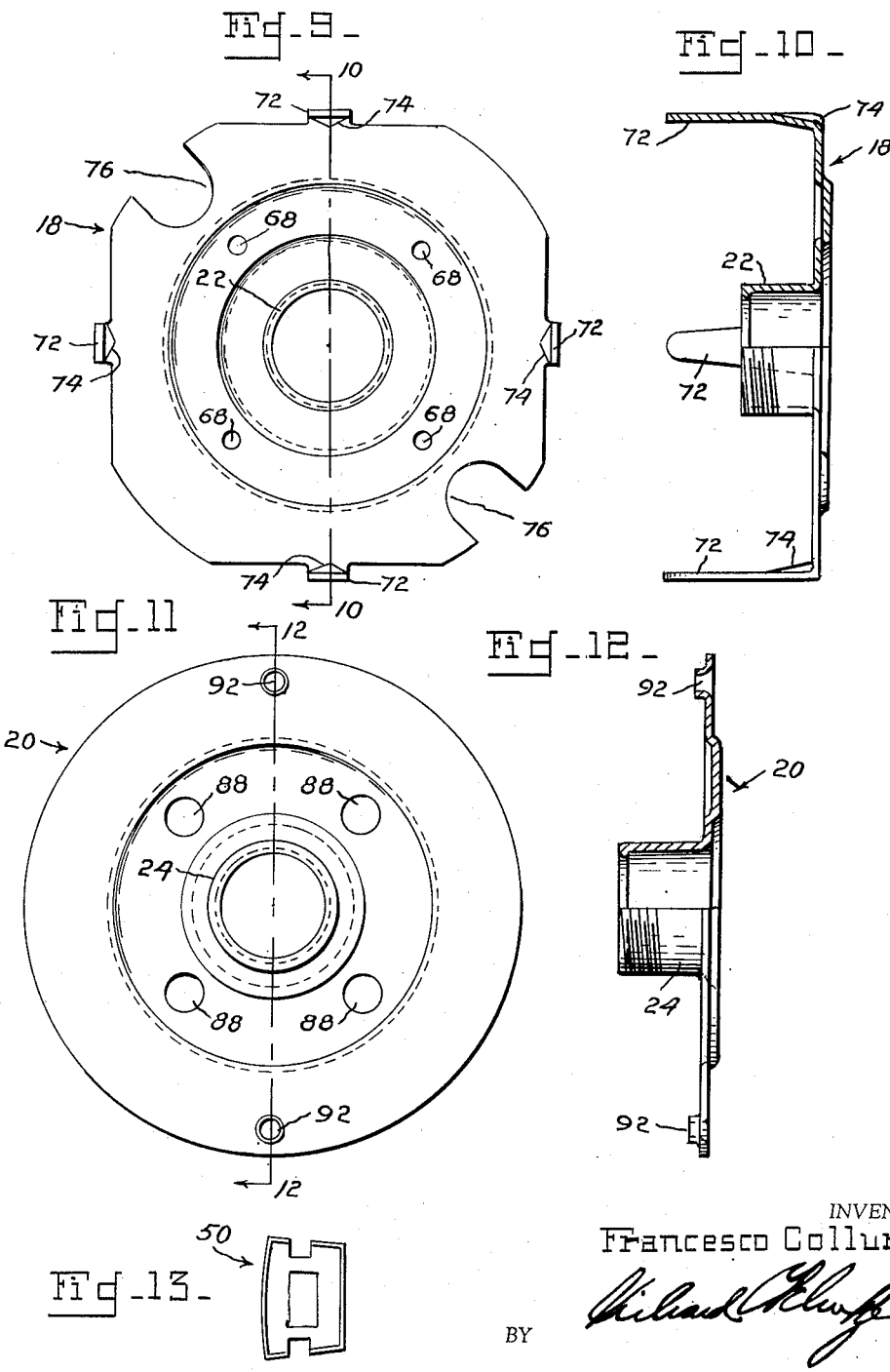

United States Patent Office 2,761,659
Patented Sept. 4, 1956

2,761,659
FOOD AND BEVERAGE BLENDER

Francesco Collura, New York, N. Y., assignor to The Winsted Hardware Manufacturing Company, Winsted, Conn., a corporation of Connecticut Application January 4, 1952, Serial No. 264,925

11 Claims. (Cl. 259—108)

This invention relates in general to improvements in food and beverage mixers, disintegrators or blenders and is concerned particularly with improvements in devices sold under the trademark Blendor.

Mixing devices of the above character generally comprise a portable base shell presenting an upper seat for removably receiving a jar or container provided with rotary blades at its bottom interior for agitating the ingredients and a relatively high speed motor carried within the shell with its drive shaft projecting upwardly for operative engagement with the driven shaft of the blades. It is highly important for the durable and efficient operation of such devices that the drive and driven shafts be in accurate registry and, to this end, it is necessary that the jar retaining elements and the motor shaft be maintained in proper relationship so that when the jar is seated the two shafts will be in accurate alignment. Heretofore, this relationship has been difficult constantly to maintain because in prior constructions the base shell independently carries the motor and the jar retaining elements so that there is a greater likelihood of relative displacement than if the motor and seating elements were directly connected. Also, in these prior constructions wherein the motor is suspended from or otherwise supported by the shell, the shell must necessarily be of sturdy and rigid material thus increasing the weight and cost of the device.

It is accordingly an object of the present invention to avoid the foregoing and other disadvantages of prior devices and to provide a novel arrangement of parts wherein the motor is utilized as the primary supporting element instead of the surrounding shell and wherein the motor provides a support for the shell instead of being supported by the shell as heretofore. The invention also proposes that the motor provide a support for the jar retaining elements so that these elements may be carried directly by the motor to insure accurate registry with the motor shaft instead of being independently carried by the shell as in prior constructions.

Another object of the invention is greatly to reduce manufacturing and assembly costs by providing a device having a minimum number of parts which may be very quickly and easily assembled both initially and for purposes of repairs. Concomitantly with the foregoing it is a further object of the invention to provide an overall improved device having the advantages of increased durability, efficiency, convenience and attractive appearance.

Other and further objects and advantages of the invention will be apparent from the following detailed description taken in conjunction with the accompanying drawings wherein a preferred embodiment of the principles of the invention has been selected for exemplification.

In the drawings:

Fig. 1 is a front elevational view partly in section of a food and beverage blender base unit constructed in accordance with the invention, the food or beverage jar and blending blades being omitted since they form no part of the present invention;

Fig. 2 is a plan view of the lower housing shell shown in Fig. 1;

Fig. 3 is a bottom view of Fig. 2;

Fig. 4 is a plan view of the upper housing shell shown in Fig. 1;

Fig. 5 is a bottom view of Fig. 4;

Figs. 6, 7 and 8 are, respectively, vertical sectional, front elevational and plan views of the jar retainer elements shown in Fig. 1;

Fig. 9 is a plan view of the upper motor support bracket shown in Fig. 1;

Fig. 10 is a half-sectional view taken on the line 10—10 of Fig. 9;

Fig. 11 is a plan view of the lower motor support bracket shown in Fig. 1;

Fig. 12 is a half-sectional view taken on the line 12—12 of Fig. 11; and

Fig. 13 is a plan view of one of the bumper elements positioned between the upper and lower shells as shown in Fig. 1.

Referring more particularly to the drawings, wherein like numerals refer to like parts, the base unit indicated in its entirety at 10 in Fig. 1 is composed in its essentials of upper and lower shells 12 and 14, respectively, housing a conventional relatively high speed electric motor 16. For supporting the motor 16 within the shells 12 and 14, top and bottom annular brackets 18 and 20 are secured to the opposed end bells of the motor casing, the respective brackets having central threaded shank portions 22 and 24 projecting through apertures 23 and 25 disposed centrally of the end walls of the upper and lower shells 12 and 14, respectively. Suitable top and bottom washers 28 and 30 are preferably provided and retaining nuts 26 are in threaded engagement with the projecting shanks 22 and 24 to secure the shells 12 and 14 and the motor 16 together as a unit. The drive shaft of the motor 16, as shown, projects upwardly through the central wall opening 23 and carries a suitable annular slinger 31. There is thus provided a compact simple assembly from which the motor may be removed for repairs or replacement merely by unthreading one of the nuts 26.

Inasmuch as the upper and lower housing shells 12 and 14 function essentially as a decorative covering for the motor rather than a support for the motor as heretofore and are not subjected to any particular amount of stress or torque, they may be constructed of a variety of materials, preferably light in weight. Desirably, the shells 12 and 14 may be molded from synthetic resinous material or one or both of the shells may be formed of metal.

The lower shell 14, as best shown in Figs. 2 and 3, may have a convex or sloped bottom 32 and a series of integral substantially horizontal and upright ribs 34 converging toward the central opening 25 which receives the annular shank 24 of the motor support bracket 20. Disposed between the ribs are apertures 36 in the bottom wall for the intake or exhaust of cooling air as will be hereinafter explained. Diverging upwardly and integral with the bottom wall 32 is an intermediate side wall portion 38 which preferably is provided with a stepped outer surface, as shown, and which terminates in an integral plain upright and cylindrical lip 40.

Supports for the shell 14 may be in the form of a plurality of legs or columns 42 disposed symmetrically around and integral with the bottom and intermediate side wall portions of the shell. The base ends of the legs 42 may be bored or recessed as at 44 frictionally to receive foot pads 46, suitably formed of rubber or other resilient friction material. The upper ends of the legs 42, as shown, terminate short of the lip portion 40 and together with the adjacent cut away edges 48 of the lip 40 form seats for frictionally receiving resilient bumper elements 50 as shown in detail in Fig. 13, which also may suitably be formed of rubber or other resilient material. The bumpers 50 are thus positioned for cushion contact with the upper shell 12 and the peripheral area extending between the bumpers provides an open space in the junction between the shells 12 and 14 for cooling air. Preferably the usual motor fan is arranged to blow downwardly and thus space is employed for the intake of air to be exhausted through the bottom apertures 36 after circulation over the casing of the motor 16. It will be apparent that the annular air intake space between the shells is positioned intermediate the height of the base sufficiently close to the bottom ports 36 and central opening 25 to create a partial vacuum to facilitate air exhaust but sufficiently above the same to avoid recirculation of exhausted air.

The upper shell 12, as best shown in Figs. 4 and 5, is provided with an upper crown portion 52 and an integral top wall 54 having symmetrically arranged apertures 56 for a purpose which will hereinafter appear and the central opening 23 which receives the annular shank 22 of the motor support bracket 18. The remainder of the shell 12 comprises an integral skirt 58 carrying integral interior upright ribs 60 which function not only to reinforce the shell but in a measure to direct the intake air toward the upper portion of the motor casing, the path of circulation then proceeding downwardly. As shown, certain of the ribs 60 may be shortened or omitted entirely at points of contact of the interior wall of the shell 12 with the bumper elements 50.

In lieu of projecting the usual motor control switch from the side wall of the base in the common manner where the switch is often accidentally actuated upon contact with other adjoining objects, I have found that the switch may be more safely and conveniently disposed on the crown portion 52 of the shell 12 which, as shown, is set back from the outer skirt or side wall 58. To this end, an aperture 62 is provided in the sloped wall of the portion 52 for reception of a suitable switch, the structure of which otherwise may be conventional and which is not therefor shown in detail. I have also found it convenient and desirable at this point slightly to recess the surrounding exterior wall portions of the crown 52 and the skirt 58 as shown at 64 for the reception of a combined name plate and switch base or the like 66.

The motor support upper bracket 18, shown in detail in Figs. 9 and 10, may, if desired, be in the form of a metal stamping having a plurality of radially distributed apertures 68 for receiving rivets or the like 70 whereby to secure the bracket to the top end bell of motor 16. As shown in Fig. 1, the rivets 70 spacedly mount the bracket 18 to provide for circulation of air over the top end bell of the motor. The upper motor bracket 18 carries at equi-spaced peripheral points a plurality of integral upright rigid fingers 72, one for each of the windows 56 of the upper shell 12, ribs 74 being preferably provided at the junction of the fingers 72 with the peripheral edge of the bracket 18. Cut-off finger openings 76 may be provided to facilitate placement and removal of the bracket with respect to the motor.

As shown in Fig. 1, the projecting fingers 72 function accurately to position the jar seat defining and retaining members 78 in the shell windows 56 so as to insure correct positioning of the jar indicated in fragment at C coaxially of the drive shaft of motor 16. These retaining members 78, as best shown in Figs. 6–8, are provided each with a longitudinal bore or upright internal slot 80 for frictionally receiving a finger 72 and an internal flange 81 to bear against the finger 72. Externally, each member 78 is provided with a slightly tapering face 82 for guiding the jar, an intermediate ledge portion 84 upon which the bottom of the jar may rest and an extended base portion 86 for positioning between the opposed face portions of the top shell wall 54 and the bracket 18 and compression therein when the upper nut 26 is tightened. It will thus be apparent that the jar retaining elements 78 are secured directly to the motor through the medium of bracket 18 and merely project through the upper shell 12 to which they are not otherwise secured.

The lower motor support bracket 20, as shown in detail in Figs. 11 and 12, may also be a metal stamping similarly having a plurality of radially distributed apertures 88 for receiving rivets or the like 90 whereby to secure the bracket to the bottom end bell of motor 16. As shown in Fig. 1, the rivets 90 spacedly mount the bracket 20 to provide for circulation of air over the bottom end bell of the motor and the elevated spaced ribs 39 upon which the bracket 20 rests provides a communicating path between the interior of the assembled shells 12 and 14 and the openings 25 and 36 in the lower shell 14. Ordinarily, the lower retaining nut 26 in threaded engagement with the projecting central shank 24 will be sufficient to secure the lower shell 14 to the bracket 20 but, if desired, the bracket may be provided with extruded holes 92 to receive self tapping screws further to secure the shell to the bracket.

It will be understood that the present invention is not confined to the precise construction and arrangement of parts herein illustrated and described but embraces a variety of different modifications thereof all within the definitions and scope of the following claims. Further, it will be understood that various elements or features in the combination of parts herein illustrated and described are capable of use independently or in other combinations of elements not only for food and beverage blenders but other electrically driven appliances and devices.

I claim:

1. In an electrically driven food and beverage blender, a base unit which comprises, an electric motor including a drive shaft at one end, a housing for said motor, an annular bracket disposed within said housing and secured to the drive shaft end of said motor and means carried by said annular bracket and extending exteriorly of said housing for retaining a food and beverage container coaxially of said drive shaft.

2. In an electrically driven food and beverage blender, a base unit which comprises, a housing, an electric motor disposed within said housing for driving connection with the rotary blade assembly of a food and beverage container, means carried by said electric motor to secure said motor and housing in engagement and containing retaining members carried by said securing means projecting through apertures exteriorly of said housing to position the rotary blade assembly of the container in coaxial drive relationship with said motor.

3. In an electrically driven food and beverage blender, a base unit which comprises, an upright electric motor, upper and lower shell sections forming a housing for said motor, annular brackets carried by the upper and lower end portions of said motor, the said brackets having central projecting members extended through central apertures in said upper and lower shell sections, upper and lower means engaging said upper and lower shell sections and said upper and lower projecting members whereby to secure said shell sections, brackets and motor together as a unit and upright members carried by said upper annular bracket and disposed radially equi-distant from the axis of said motor, the said upright members extending upwardly of said housing to provide retaining means for positioning a food and beverage container coaxially of said motor.

4. In a food and beverage blender including a container, an electric motor for operating said blender, a shell housing for said motor, an annular bracket positioned upon the upper portion of said motor within said housing, the said motor, motor bracket and housing being secured together as a unit, and a retaining means carried by said bracket and extending through said housing for positioning said container coaxially of said motor.

5. In combination, an electric motor, a pair of opposed shell sections forming a housing for said motor, annular brackets carried by opposed end portions of said motor and disposed within said housing, means carried by one of said annular brackets for retaining a driven device coaxially of the drive shaft of said motor, the said brackets having projecting portions extended through apertures formed in opposed end walls of said shell sections and means engaging said projecting portions for securing said motor and housing shell sections together as a unit.

6. In combination, an electric motor having a shaft for operating a driven device, a housing for said motor, an annular bracket carried by said motor and disposed within said housing, said housing being provided with a central opening through which said drive shaft projects and other radially disposed openings, and fingers carried by said bracket and projecting through said radially disposed openings to engage and to position said driven device coaxially of said drive shaft.

7. In an electrically driven food and beverage blender, an upright base unit which comprises, an outer shell, an upright electric motor housed within said shell, the said shell being composed of separate upper and lower sections secured together, the upper of said sections overlapping the lower to provide a space between said overlap for circulating air, means driven by said motor for circulating such air to cool said motor and threaded removable means for securing said motor to said shell at the upper and lower portions of said shell.

8. In an electrically driven food and beverage blender, an upright base unit which comprises, an outer shell, an upright electric motor housed within said shell, the said shell being composed of separate upper and lower sections secured together, the upper of said sections overlapping the lower to provide a space between said overlap for circulating air, means driven by said motor for circulating such air to cool said motor and threaded removable means for securing said motor to said shell in substantially vertical alignment at the top and bottom portions of said shell.

9. In an electrically driven food and beverage blender, an upright base unit which comprises, an outer shell, an upright electric motor housed within said shell, the said shell being composed of separate upper and lower sections secured together, the upper of said sections overlapping the lower to provide a space between said overlap for circulating air, means driven by said motor for circulating such air to cool said motor, means for securing said motor within said shell whereby the drive shaft of said motor and said shell are axially positioned and means projecting upwardly of said shell for positioning an electrically driven food and beverage blender container axially of said motor drive shaft.

10. In an electrically driven food and beverage blender, an upright base unit which comprises, an outer shell, an upright electric motor housed within said shell, the said shell being composed of separate upper and lower sections secured together, the upper of said sections overlapping the lower to provide a space between said overlap for circulating air, means driven by said motor for circulating such air to cool said motor, means depending from said upper section for securing said motor within said shell and positioning the drive shaft of said motor centrally of said upper section and means projecting upwardly of said upper section for positioning an electrically driven food and beverage blender container axially of said motor drive shaft.

11. In an electrically driven food and beverage blender, an upright base unit which comprises, an outer shell, an upright electric motor housed within said shell, the said motor including a drive shaft, the said shell being composed of separate upper and lower sections secured together, and integral means secured to said upper section for securing said motor within said shell and positioning the blender container whereby the drive shaft of said motor and said blender container are in axial alignment.

References Cited in the file of this patent

UNITED STATES PATENTS

| | | |
|---|---|---|
| 1,174,955 | Balzar | Mar. 14, 1916 |
| 1,411,442 | Leece | Apr. 4, 1922 |
| 1,414,612 | Aufiero | May 2, 1922 |
| 1,521,359 | Costa | Dec. 30, 1924 |
| 1,764,437 | Elsasser | June 17, 1930 |
| 1,927,184 | Poplawski | Sept. 19, 1933 |
| 2,107,819 | Faber | Feb. 8, 1938 |
| 2,284,155 | Landgraf | May 26, 1942 |
| 2,450,422 | Elks | Oct. 5, 1948 |
| 2,505,854 | Curzon | May 2, 1950 |
| 2,548,633 | Stephenson | Apr. 10, 1951 |
| 2,607,819 | Sutton | Aug. 19, 1952 |

FOREIGN PATENTS

| | | |
|---|---|---|
| 478,413 | France | Sept. 20, 1915 |
| 479,740 | Great Britain | Feb. 10, 1938 |
| 537,016 | Great Britain | June 5, 1941 |